Patented Oct. 10, 1939

2,175,809

UNITED STATES PATENT OFFICE 2,175,809

ACCELERATOR

Joy G. Lichty, Stow, Ohio, assignor to Wingfoot Corporation, Wilmington, Del., a corporation of Delaware No Drawing. Application September 7, 1933, Serial No. 688,437

5 Claims. (Cl. 18—53)

This invention relates to a new class of compounds the members of which are valuable either as such or with other substances, in the vulcanization of rubber. It relates, among other things, to a method of accelerating the processes of vulcanization by incorporating in the unvulcanized stock certain chemical compounds which not only are comparatively easy to prepare but also impart desirable physical properties to the vulcanized products. The compounds with which the invention deals are new in themselves and may be described as carbonyl alkyl esters of dithiocarbamic acids.

Illustrative of the compounds which the invention concerns is the type formula

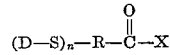

wherein X is a radical containing oxygen or nitrogen directly attached to the carbon of the carbonyl group, D is a thiocarbamyl group, $n$ is one or more and R is an alkyl group. Thus X may be an oxy group such, for example, as hydroxy, alkoxy, aryloxy, aralkoxy, metal oxy, or an ammonium oxy group such as

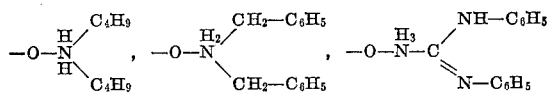

it being understood that the $C_4H_9$, $—CH_2—C_6H_5$ and $—C_6H_5$ groups are representative of other groups of a similar nature which may be employed instead. Also, X may be $—NH_2$, $—NH—aryl$, $—NH—alkyl$, $—NH—aralkyl$, $N(dialkyl)$, $—N(diaryl)$, $—N(alkyl)$ (aryl), etc. In the formula given above, R represents any alkyl group. Where the fatty acid employed is acetic acid, R is methyl; similarly, where butyric acid, for instance, is employed, R is a propyl group. When the compounds are to be employed as accelerators of vulcanization it will generally be found that it is preferable that the carbonyl group be separated from the dithiocarbamate radical by a single carbon atom. This may be accomplished by employing halogenated fatty acids in which the halogen is attached to the carbon atom alpha to the carbonyl group.

In the type formula, D is more specifically the group

In the latter group, $R_1$ and $R_2$ may be like or unlike radicals or, if desired, $R_1$ and $R_2$ may be taken together to form a cyclic alkylene chain. Also, either $R_1$ or $R_2$, but not both, may be hydrogen.

In general, these compounds are prepared simply by bringing together solutions of a dithiocarbamate and a halogen-substituted fatty acid salt or amide, as the case may be. In certain cases, a compound forms at once; in others, it may be necessary to allow the mixture of the solutions to stand for a few hours or to heat the mixture slightly. In any case, the product forms as a solid or oil which may be easily separated and purified. The reaction is found to proceed with equal facility with either a mono or di-halogenated fatty acid or amide.

As illustrating the preparation of these compounds there may be mentioned the preparation of carboxy methyl di(dimethyl dithiocarbamate). In preparing this material, an aqueous solution containing ¼ mol of ammonium dichloracetate and ½ mol of sodium dimethyl dithiocarbamate is heated on a water bath at 50 degrees C. for ¾ of an hour, after which it is cooled with ice and acidified with hydrochloric acid. The amount of water employed may be varied as desired, it only being desirable that a sufficient quantity to dissolve the materials be used. The solid is removed by filtration and the aqueous solution extracted with a diethyl ether. The total yield approximates 72%, the material being obtained in the form of a solid which decomposes on melting. The reactions involved may be expressed as follows:

$2(CH_3)_2N—CSS—Na + Cl_2=CHCOONH_4 \rightarrow$
$\quad [(CH_3)_2=N—CSS]_2=CHCOONH_4 + 2NaCl$ $[(CH_3)_2=N—CSS]_2=CHCOONH_4 + HCl \rightarrow$
$\quad [(CH_3)_2=N—CSS]_2=CHCOOH + NH_4Cl$ In the preparation of carboxy methyl di(diethyl dithiocarbamate), an aqueous solution containing ½ mol of sodium diethyl dithiocarbamate and ¼ mol of ammonium dichloracetate is heated at 50 degrees C. on a water bath for 1¾ hours. Similarly, the amount of water employed as solvent may be varied. It is then chilled with ice and acidified with hydrochloric acid, giving a dark-colored oil. The oil is removed by means of a separatory funnel, after which the reaction product is extracted with diethyl ether from the aqueous layer. The total yield of the dry product is in the neighborhood of 64%.

For the preparation of carboxy methyl di-(pentamethylene dithiocarbamate), an aqueous solution containing ¼ mol of ammonium dichloracetate and ½ mol of sodium pentamethylene dithiocarbamate is heated on a steam bath for a short time. The liquid is acidified with hydrochloric acid. There results a light brown solid which decomposes on melting. The reactions for this preparation may be expressed as follows:

$2C_5H_{10}N-CSSNa+Cl_2CHCOONH_4 \rightarrow$
$(C_5H_{10}N-CSS)_2CHCOONH_4+2NaCl$
$(C_5H_{10}N-CSS)_2CHCOONH_4+HCl \rightarrow$
$(C_5H_{10}NCSS)_2CHCOOH+NH_4Cl$ Illustrative of the preparation of a carbonyl alkyl ester of a dithiocarbamate having a nitrogen atom directly attached to the carbon of the carbonyl group is that of anilino carbonyl methyl di(pentamethylene dithiocarbamate). This compound may be prepared by refluxing for a period of 30 minutes a solution of 20.4 grams of dichloro acet anilid and 50 grams of piperidinium penta methylene dithiocarbamate. A precipitate is formed which, together with the solvent, is poured into approximately 1½ liters of water. The solid, aniline carbonyl methyl dithiocarbamate, upon being filtered, washed and dried, is obtained in a yield of 95%. When further purified by recrystallization from xylene or from a mixture of alcohol and chloroform, it melts with decomposition at 177° C. The equation representing the reaction is as follows:

$C_6H_5NHCOCHCl_2+2C_5H_{10}NCSSNH_2C_5H_{10} \rightarrow$
$C_6H_5NHCONH(SSCNC_5H_{10})_2+2C_5H_{10}NH_2Cl$ In the preparation of carbamyl methyl dimethyl dithiocarbamate, an equimolecular mixture of ammonium chloride and mono chloro acet amide in 175 cc. of warm water is added, meanwhile stirring, to 0.4 mol of an aqueous solution of sodium dimethyl dithiocarbamate. The mixture is heated to 45° C., whereupon a solid separates out. The mixture is then cooled to 25° C. and the solid filtered off. Upon washing and drying, 38.7 grams of carbamyl methyl dimethyl dithiocarbamate melting at 122° C. are obtained. By partial evaporation of the filtrate under reduced pressure, an additional yield of 13 grams of product is obtained. This additional material when recrystallized from alcohol melts at 125° C.

Other compounds of similar nature are carbamyl methyl penta methylene dithiocarbamate, melting at 144–145° C., and anilino carbonyl methyl pentamethylene dithiocarbamate, melting at 121° C.

In the preparation of the diphenylguanidine salt of carboxy methyl di(dimethyl dithiocarbamate), a mixture of 14.9 grams of carboxy methyl di(dimethyl dithiocarbamate) and 10.6 grams of diphenylguanidine is dissolved in 55 cc. of alcohol. The solvent is removed by long standing in the open, finally allowing the mixture to remain over calcium chloride in a vacuum desiccator for 48 hours. The yield is quantitative. The reaction proceeds as follows:

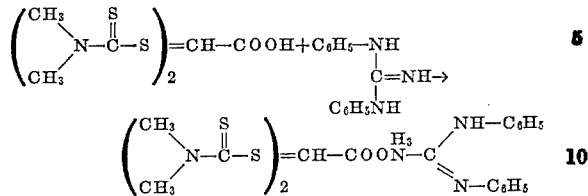

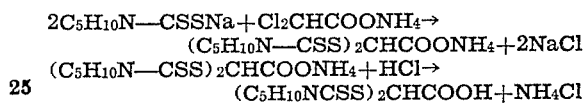

In the preparation of alpha carboxy propyl penta methylene dithiocarbamate, one mol of the ammonium salt of alpha brom butyric acid is dissolved in water and the solution mixed with an aqueous solution of one mol of sodium penta methylene dithiocarbamate. The mixture is allowed to stand over night after which an acid, such as hydrochloric acid, is added to precipitate the product, alpha carboxy propyl penta methylene dithiocarbamate, a colorless solid melting at 114–115° C. The reaction proceeds as follows:

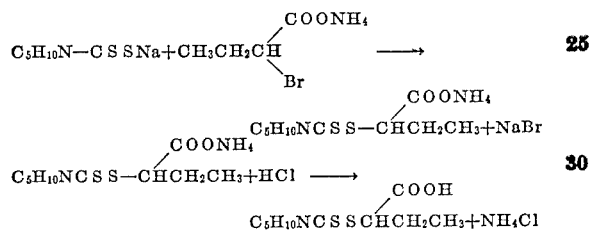

Other oxy carbonyl alkyl esters of the dithiocarbamic acids may be prepared similarly. Thus, carboxy methyl penta methylene dithiocarbamate may be prepared by permitting a solution of 366 grams of sodium penta methylene dithiocarbamate and 208 grams of ammonium mono chlor acetic acid in 4 liters of water to stand over night. Upon the addition of an excess of an acid a precipitate forms which, upon being filtered, washed and dried is obtained as a colorless solid, carboxy methyl penta methylene dithiocarbamate, melting at 146–147° C.

The cycle hexyl amine salt of carboxy methyl penta methylene dithiocarbamate may be prepared by adding slowly, while stirring, 20.8 grams of cyclo hexyl amine to a suspension of 43.6 grams of carboxy methyl penta methylene dithiocarbamate in 275 cc. of benzene. All goes into solution for a short period of time, after which a solid separates out. By adding 200 cc. of gasoline, additional precipitation is obtained. The solid, when filtered and washed with gasoline, gives 63.2 grams of a colorless product. The reaction proceeds as follows:

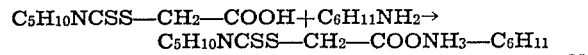

It will of course be understood that these ammonium salts may also be prepared by the action of the corresponding substituted ammonium salt of the acid on the sodium dithiocarbamate in a suitable solvent.

The zinc salt of carboxy methyl penta methylene dithiocarbamate is similarly prepared by adding, with stirring, 24.5 grams of zinc acetate in 80 cc. of water to a solution of 8 grams of solid sodium hydroxide and 43.8 grams of carboxy methyl penta methylene dithiocarbamates in 100 cc. of water. A pasty precipitate forms which sets upon standing. The solid is colorless, and upon being filtered, washed and dried, is obtained in a yield of 93%.

Dithiocarbamates derived from other amines may be employed in the practice of the invention, examples being those derived from dibutyl amine, methyl cyclo hexyl amine, methyl aniline, dibenzyl amine, ditetra hydro furfuryl amine, ethyl cyclo hexyl amine, methyl naphthylamine, diamyl amine and the like. Also, other halogen derivatives of the fatty acids may be employed, examples being alpha chlor propionic acid, dichlor propionic acid, dibrom butyric acid, dichlor butyric acid, dibrom acetic acid and the like. When the acids are to be used in the preparation of accelerators of vulcanization, it will generally be preferable to attach the halogens to the carbon atom alpha to the carbonyl group. Other acet amides which may be reacted with a solution of any dithiocarbamate are the mono- and dichlor and brom derivatives of acet diphenyl amide, nitro acet anilide, acet toluide, acet phenyl naphthyl amide, acet dibutyl amide, acet dicyclo hexyl amide, acet ethyl benzyl amide, acet methyl amide, and the like.

Other ammonium oxy carbonyl alkyl disubstituted dithiocarbamates which have been found to be excellent accelerators of vulcanization are piperidinium oxy carbonyl, methyl penta methylene dithiocarbamate, the ethylene diamine salt of carboxy methyl penta methylene dithiocarbamate, the diphenyl-guanidine salt of carboxy methyl penta methylene dithiocarbamate and the para phenylene diamine salt of carboxy methyl penta methylene dithiocarbamate. Still others are diethyl ammonium oxy carbonyl methyl penta methylene dithiocarbamate, a colorless solid melting at 125–126° C.; cyclohexyl ammonium oxy carbonyl methyl diethyl dithiocarbamate, a colorless solid melting at 188–189° C., piperidinium oxy carbonyl methyl diethyl dithiocarbamate, a viscous liquid; diethyl ammonium oxy carbonyl methyl diethyl dithiocarbamate, a brown viscous liquid; dimethyl ammonium oxy carbonyl methyl diethyl dithiocarbamate, a light amber liquid; cyclohexyl ammonium oxy carbonyl methyl dimethyl dithiocarbamate, a colorless solid melting at 201–203° C.; piperidinium oxy carbonyl methyl dimethyl dithiocarbamate, a colorless solid melting at 109–110° C.; diethyl ammonium oxy carbonyl methyl dimethyl dithiocarbamate, a colorless solid melting at 88–89° C.; dimethyl ammonium oxy carbonyl methyl dimethyl dithiocarbamate, a yellow liquid, and dimethyl ammonium oxy carbonyl methyl pentamethylene dithiocarbamate, a colorless solid. Others are carboxy methyl dimethyl dithiocarbamate, a colorless solid melting at 150–152° C.; carboxy methyl diethyl dithiocarbamate, a colorless solid melting at 89–90° C.; and the diphenyl guanidine salt of carboxy methyl dimethyl dithiocarbamate, a colorless solid melting at 145–146° C.

Other metallic salts of these oxy carbonyl alkyl esters of dithiocarbamic acids which may be employed as accelerators of vulcanization are the calcium, magnesium, sodium, potassium, and lead salts.

The compounds to which the invention relates may be employed as accelerators of vulcanization in substantially any of the standard rubber formulae, one found particularly satisfactory being the following:

|  | Parts by weight |
|---|---|
| Extracted pale crepe rubber | 100 |
| Zinc oxide | 5 |
| Sulphur | 3 |
| Stearic acid | 1.5 |
| Accelerator | 0.5 |

After vulcanization, physical tests on stocks so made up have been run with the following results:

| Cure | | Tensile | Elongation | Stress kgs./cm.² at— | |
|---|---|---|---|---|---|
| Time in minutes | Temperature, °F. | | | 500% elongation | 700% elongation |

CARBOXY METHYL DI(DIMETHYL DITHIOCARBAMATE)

| 10 | 260 | 142 | 770 | 24 | 94 |
| 15 | 260 | 177 | 725 | 35 | 152 |
| 20 | 260 | 202 | 705 | 46 | 195 |
| 30 | 260 | 177 | 685 | 45 | |
| 40 | 260 | 163 | 695 | 39 | |

CARBOXY METHYL DI(DIETHYL DITHIOCARBAMATE)

| 10 | 260 | 98 | 895 | 13 | 33 |
| 15 | 260 | 119 | 865 | 14 | 47 |
| 20 | 260 | 141 | 805 | 21 | 75 |
| 35 | 260 | 116 | 675 | 34 | |

CARBOXY METHYL DI(PENTAMETHYLENE DITHIOCARBAMATE)

| 15 | 260 | 73 | 905 | 11 | 25 |
| 20 | 260 | 101 | 860 | 15 | 41 |
| 35 | 260 | 129 | 805 | 20 | 68 |
| 50 | 260 | 145 | 780 | 25 | 90 |

DIPHENYLGUANIDINE SALT OF CARBOXY METHYL DI(DIMETHYL DITHIOCARBAMATE)

| 5 | 260 | 114 | 885 | 12 | 31 |
| 10 | 260 | 182 | 755 | 28 | 125 |
| 15 | 260 | 197 | 715 | 40 | 183 |
| 20 | 260 | 202 | 680 | 52 | |

CYCLOHEXYL AMINE SALT OF CARBOXY-METHYL-PENTAMETHYLENE DITHIOCARBAMATE

| 30 | 260 | 40 | 825 | 8 | 20 |
| 40 | 260 | 62 | 830 | 10 | 30 |
| 60 | 260 | 94 | 930 | 10 | 28 |
| 80 | 260 | 128 | 765 | 22 | 88 |

PIPERIDINE SALT OF CARBOXY METHYL PENTAMETHYLENE DITHIOCARBAMATE

| 20 | 260 | 34 | 890 | 6 | 13 |
| 30 | 260 | 64 | 880 | 8 | 20 |
| 40 | 260 | 86 | 890 | 11 | 30 |
| 60 | 260 | 130 | 875 | 14 | 47 |

ZINC SALT OF CARBOXY METHYL PENTAMETHYLENE DITHIOCARBAMATE

| 30 | 285 | 22 | 910 | 4 | 8 |
| 45 | 285 | 52 | 930 | 7 | 14 |
| 60 | 285 | 76 | 825 | 10 | 27 |
| 90 | 285 | 87 | 850 | 13 | 35 |
| 120 | 285 | 106 | 850 | 15 | 42 |

ZINC SALT OF CARBOXY METHYL PENTAMETHYLENE DITHIOCARBAMATE 0.50 PART; DIPHENYLGUANIDINE 0.20 PART

| 40 | 260 | 25 | 950 | 4 | 8 |
| 60 | 260 | 75 | 870 | 10 | 28 |
| 80 | 260 | 42 | 690 | 14 | |

ETHYL CARBOXY METHYL DI(DIETHYL DITHIOCARBAMATE)

| 20 | 260 | 75 | 900 | 11 | 26 |
| 25 | 260 | 104 | 845 | 15 | 43 |
| 40 | 260 | 148 | 775 | 25 | 94 |
| 60 | 260 | 185 | 760 | 32 | 126 |

ETHYL CARBOXY METHYL DI(DIMETHYL DITHIOCARBAMATE)

| 15 | 260 | 52 | 875 | 8 | 20 |
| 20 | 260 | 108 | 845 | 15 | 45 |
| 30 | 260 | 156 | 780 | 24 | 95 |
| 40 | 260 | 172 | 720 | 38 | 154 |

| Cure | | Tensile | Elongation | Stress kgs./cm.² at— | |
|---|---|---|---|---|---|
| Time in minutes | Temperature, °F. | | | 500% elongation | 700% elongation |

ANILINO CARBONYL METHYL DI-(PENTAMETHYLENE DITHIOCARBAMATE)

| | | | | | |
|---|---|---|---|---|---|
| 20 | 260 | 35 | 975 | 6 | 10 |
| 30 | 260 | 114 | 920 | 12 | 30 |
| 40 | 260 | 135 | 850 | 17 | 54 |
| 60 | 260 | 180 | 790 | 28 | 107 |

CARBAMYL METHYL PENTAMETHYLENE DITHIOCARBAMATE 0.50 PART—DIPHENYLGUANIDINE 0.20 PART

| | | | | | |
|---|---|---|---|---|---|
| 40 | 285 | 56 | 870 | 10 | 23 |
| 60 | 285 | 78 | 850 | 12 | 32 |
| 80 | 285 | 90 | 840 | 13 | 40 |
| 120 | 285 | 102 | 820 | 15 | 47 |

CARBAMYL METHYL DIMETHYL DITHIOCARBAMATE 0.50 PART—DIPHENYLGUANIDINE 0.20 PART

| | | | | | |
|---|---|---|---|---|---|
| 40 | 285 | 46 | 900 | 8 | 17 |
| 60 | 285 | 70 | 870 | 11 | 30 |
| 80 | 285 | 77 | 830 | 13 | 36 |

ETHYLENE DIAMINE SALT OF CARBOXY METHYL PENTAMETHYLENE DITHIOCARBAMATE

| | | | | | |
|---|---|---|---|---|---|
| 20 | 260 | 20 | 820 | 5 | 10 |
| 30 | 260 | 35 | 860 | 7 | 15 |
| 40 | 260 | 64 | 840 | 10 | 30 |
| 60 | 260 | 94 | 885 | 12 | 34 |
| 80 | 260 | 135 | 800 | 20 | 75 |
| 60 | 285 | 123 | 800 | 19 | 67 |

ETHYLENE DIAMINE SALT OF CARBOXY METHYL PENTAMETHYLENE DITHIOCARBAMATE 0.50 PART—DIPHENYLGUANIDINE 0.20 PART

| | | | | | |
|---|---|---|---|---|---|
| 20 | 260 | 18 | 920 | 4 | 7 |
| 30 | 260 | 56 | 950 | 7 | 16 |
| 40 | 260 | 74 | 950 | 9 | 20 |
| 60 | 260 | 114 | 900 | 12 | 37 |

DIPHENYLGUANIDINE SALT OF CARBOXY METHYL PENTAMETHYLENE DITHIOCARBAMATE

| | | | | | |
|---|---|---|---|---|---|
| 40 | 260 | 18 | 960 | 4 | 6 |
| 80 | 260 | 60 | 940 | 6 | 18 |
| 120 | 260 | 86 | 870 | 11 | 37 |
| 160 | 260 | 120 | 830 | 15 | 54 |

P-PHENYLENE DIAMINE SALT OF CARBOXY METHYL PENTAMETHYLENE DITHIOCARBAMATE

| | | | | | |
|---|---|---|---|---|---|
| 30 | 260 | 20 | 850 | 5 | 10 |
| 40 | 260 | 27 | 825 | 7 | 15 |
| 60 | 260 | 80 | 880 | 10 | 28 |
| 80 | 260 | 104 | 815 | 15 | 52 |
| 60 | 285 | 126 | 810 | 20 | 64 |

CARBOXY METHYL PENTAMETHYLENE DITHIOCARBAMATE

| | | | | | |
|---|---|---|---|---|---|
| 25 | 285 | 65 | 810 | 12 | 35 |
| 50 | 285 | 96 | 850 | 12 | 37 |
| 70 | 285 | 138 | 860 | 17 | 52 |
| 100 | 285 | 133 | 860 | 17 | 49 |

These compounds, new in themselves, possess valuable properties as accelerators of vulcanization. As is disclosed in the preceding data, they may be employed either by themselves or in conjunction with other basic organic nitrogen-containing accelerators, such as diphenylguanidine, diortho tolyl guanidine, diphenylguanidine oxalate, diphenylguanidine succinate, cyclo hexyl ammonium fumarate and the like. It will be noted that, in general, the dihalogen fatty acid or dihalogen acetamide derivatives of the dithiocarbamates are more powerful accelerators than the mono halogen derivatives. Consequently, with the dihalogen derivatives, activators will not usually be necessary, although they may be found desirable in certain instances. With the mono halogen derivatives, on the other hand, activators are in most cases desirable, although not invariably necessary.

This application is, in part, a continuation of application Serial No. 603,454, filed April 5, 1932.

It is intended that the patent shall cover by suitable expression in the appended claims, whatever features of patentable novelty reside in the invention.

What is claimed is:

1. The process of accelerating the vulcanization of rubber which comprises vulcanizing in the presence of a secondary saturated amine salt of acetic acid in which two hydrogens of the methyl group adjacent the CO are each replaced by the radical of a secondary aliphatic dithio carbamic amino dithiocarbonic acid.

2. The process of accelerating the vulcanization of rubber which comprises vulcanizing in the presence of a compound having the formula

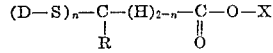

wherein D is an aliphatic thio carbamyl radical, $n$ is two in each instance, R is hydrogen, and X is a binary aliphatic ammonium radical.

3. The process which comprises incorporating within rubber sulfur and a salt of an organic amine with a compound of the formula:

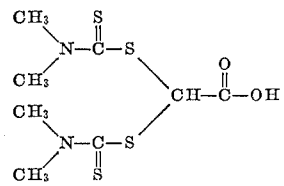

and vulcanizing the mixture.

4. The process which comprises incorporating within rubber sulfur and a salt of an organic amine with acetic acid in which two hydrogens of the methyl group adjacent the CO are each replaced by the radical of a secondary aliphatic dithio carbamic acid, and vulcanizing the mixture.

5. The process of accelerating the vulcanization of rubber which comprises vulcanizing in the presence of a compound having the formula $(D-S)_2-CH-COOX$, wherein D is an aliphatic thio carbamyl radical and X is an organic amine radical.

JOY G. LICHTY.

CERTIFICATE OF CORRECTION.

Patent No. 2,175,809.  October 10, 1939.

JOY G. LICHTY.

It is hereby certified that error appears in the printed specification of the above numbered patent requiring correction as follows: Page 4, second column, line 29, claim 1, strike out the words "amino dithiocarbonic" and that the said Letters Patent should be read with this correction therein that the same may conform to the record of the case in the Patent Office.

Signed and sealed this 14th day of November, A. D. 1939.

(Seal)

Henry Van Arsdale,
Acting Commissioner of Patents.